United States Patent [19]

Rinne

[11] Patent Number: 5,476,268
[45] Date of Patent: Dec. 19, 1995

[54] SEAL ASSEMBLY WITH A HARD SEAL LAYER ACTUATED THROUGH A SILICONE LAYER

[75] Inventor: Erkki Rinne, Espoo, Finland

[73] Assignee: Unicraft Oy, Finland

[21] Appl. No.: 299,750

[22] Filed: Sep. 1, 1994

Related U.S. Application Data

[63] Continuation of Ser. No. 23,896, Feb. 26, 1993, abandoned, which is a continuation-in-part of Ser. No. 761,741, Sep. 16, 1991, abandoned.

[30] Foreign Application Priority Data

Mar. 15, 1990 [WO] WIPO ............... PCT/FI90/00065

[51] Int. Cl.$^6$ ............... B23P 15/00; F16J 15/46
[52] U.S. Cl. ............................................ 277/3
[58] Field of Search .................... 277/3, 27, 34, 277/34.3, 164, 901, 22, 26, 227

[56] References Cited

U.S. PATENT DOCUMENTS

| | | | |
|---|---|---|---|
| 2,756,707 | 7/1956 | Peters | 113/44 |
| 3,259,020 | 7/1966 | Walker | 90/11 |
| 3,501,868 | 3/1970 | Ganzinotti | 277/34.3 |
| 3,542,375 | 11/1970 | Renwick | 277/901 |
| 3,843,601 | 10/1974 | Bruner | 260/46.5 |
| 4,141,563 | 2/1979 | Wu | 277/152 |
| 4,227,702 | 10/1980 | Thate | 277/34.3 |
| 4,256,314 | 3/1981 | Berglund et al. | 277/27 |
| 4,300,775 | 11/1981 | Ringel | 277/226 |
| 4,448,425 | 5/1984 | von Bergen | 277/34 |
| 4,537,408 | 8/1985 | Pankoke | 277/34 |
| 4,666,164 | 5/1987 | Becker et al. | 277/901 |
| 4,686,271 | 8/1987 | Beck et al. | 528/15 |
| 4,722,957 | 2/1988 | Braun et al. | 524/262 |
| 4,741,542 | 5/1988 | Kimerly | 277/34 |

FOREIGN PATENT DOCUMENTS

| | | |
|---|---|---|
| 1170607 | 5/1964 | Germany. |
| 2931779 | 2/1980 | Germany. |
| 1073150 | 6/1967 | United Kingdom. |
| 1442225 | 7/1976 | United Kingdom. |
| WO8303448 | 10/1983 | WIPO. |
| WO9010796 | 9/1990 | WIPO. |
| WO9010809 | 9/1990 | WIPO. |
| WO9104814 | 4/1991 | WIPO. |

*Primary Examiner*—Daniel G. DePumpo
*Attorney, Agent, or Firm*—Christie, Parker & Hale

[57] ABSTRACT

A seal assembly includes a body portion of an element to be sealed, a groove formed into the surface of the body portion, a seal member of a relatively hard material for sealing a gap formed between the surface of the body portion and another element to be sealed. The groove has a space defined proximate its bottom for receiving a pressure medium, a protrusion or protrusions extending into the groove between the pressure medium space and the seal member, and a silicone rubber layer, cast in situ between the space and the seal member and around the protrusion, for transferring pressure from the pressure medium to the seal member and for sealing the groove to prevent escaping pressure medium. In accordance with another aspect of the invention, the assembly has substantially the same structure, but an inflatable tube extends into the pressure medium space, and the silicone layer is cast in situ at least partly around the tube. The protrusion need not be provided. A method for forming the seal assemblies includes casting the silicone rubber layer in situ.

4 Claims, 9 Drawing Sheets

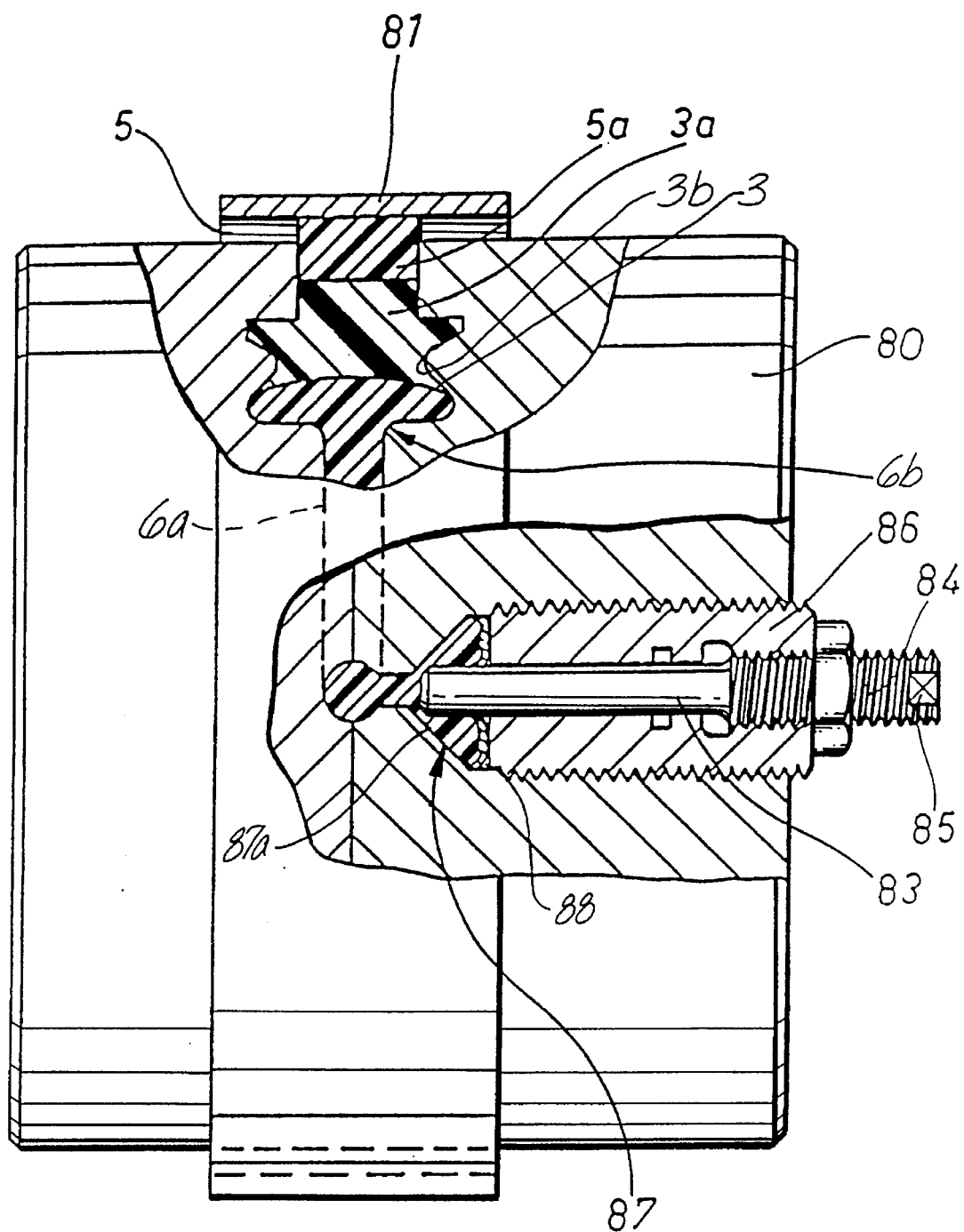

SEAL ASSEMBLY WITH A HARD SEAL LAYER ACTUATED THROUGH A SILICONE LAYER

CROSS-REFERENCE TO RELATED APPLICATIONS

This application is a continuation of application Ser. No. 08/023,896, filed Feb. 26, 1993, now abandoned, which is a continuation-in-part of application Ser. No. 07/761,741 filed Sep. 16, 1991, now abandoned.

FIELD OF THE INVENTION

The present invention relates to a seal assembly for packing a gap between two surfaces.

SUMMARY OF THE INVENTION

An object of the invention is to provide an actuable seal assembly, particularly a hydraulic-oil or compressed-air or mechanically operated seal, said seal being capable of withstanding substantial pressures, even pressures of several hundred bars, but being well suitable also for minor pressures. In the context of this application, compressed air refers not only to air but to any gas or gas mixtures. A seal of the invention finds a plurality of applications, e.g., in mechanical components having considerable pressure differences on different sides of a surface to be sealed, e.g., flap and ball valves, pistons, etc. This type of seal can also be used, e.g., for packing the joints of underwater tunnel elements and for sealing of various door and window structures, particularly in objects intended for marine conditions and in corresponding structures.

In view of the operation of a seal of the invention, which uses elastomers, it is essential that elastomer does not adhere to wall surfaces, thus allowing the displacement of elastomer in an elastomer space and/or passages in a pressurized state to a reasonable extent. The behavior of elastomer resembles that of a fluid in the sense that it is incompressible, the difference from a fluid being, however, that elastomer is self-restoring after depressurization. The preliminary tests have indicated that at a pressure of over 200 bars, e.g., in a passage having a diameter of about 5 mm and a length of about 500 mm, there occurs a nearly complete equalization of pressure throughout the entire passage. The nonadherence of elastomer to the walls of passages or elastomer spaces can be enhanced, e.g., by the application of various lubricants which are compatible with any given elastomer. The elastomer passages/spaces must generally be formed larger than corresponding fluid passages.

If necessary, elastomer can be bonded, e.g., to a sealing layer of some harder material or, when using, e.g., mechanical pistons, to the head of a piston by the application of an appropriate binder, such as, e.g., Chemosil X 5201, available from, e.g., Henkel AG (FRG).

The most significant advantage gained by a seal of the invention is that the installation work will be facilitated as the seal can be cast or molded to position in situ in an already assembled device, thus avoiding damages to the seal. In addition, after the molding operation, the seal can be pressurized/adjusted to a desired pressure reading.

Another advantage gained by a seal of the invention is a considerable pressure resistance and, depending on selected materials, also a considerable heat resistance. Another advantage is that a system provided by the seal and its pressurizing medium can be designed as a closed system, whereby, e.g., possible spills of hydraulic oil can be reliably prevented.

BRIEF DESCRIPTION OF THE DRAWINGS

The invention will now be described with reference made to the accompanying drawings, in which:

FIGS. 1–4c illustrate various respective embodiments of a seal of the invention, wherein:

FIG. 1 is a sectional view of a first embodiment of a seal assembly for a cylinder within a body;

FIG. 2 is a sectional view of a seal assembly of the invention for two concrete elements;

FIG. 3b is a sectional view taken along line III—III of FIG. 3a;

FIGS. 4a–4c show a seal assembly of the invention for combination with a flap valve, wherein:

FIG. 4a is a top plan view of the flap valve,

FIG. 4b is a front view of the valve, and

FIG. 4c is a sectional view of the valve and seal assembly;

FIGS. 6a–6c illustrate various respective embodiments of "mechanical" pressurizing means used in a seal of the invention, wherein:

FIG. 6a is a sectional view of one such pressurizing mechanism,

FIG. 6b is a sectional view of another mechanism including a spring, and

FIG. 6c is a sectional view of another pressurizing mechanism including multiple pistons of different sizes;

FIGS. 7a and 7b are sectional views of a combination of a seal of the invention and a "mechanical" pressurizing means, wherein FIG. 7a shows the seal and pressurizing means before actuating the seal; and FIG. 7b shows the seal and pressurizing means after actuating the seal.

DETAILED DESCRIPTION OF THE PREFERRED EMBODIMENTS

Figure 1:
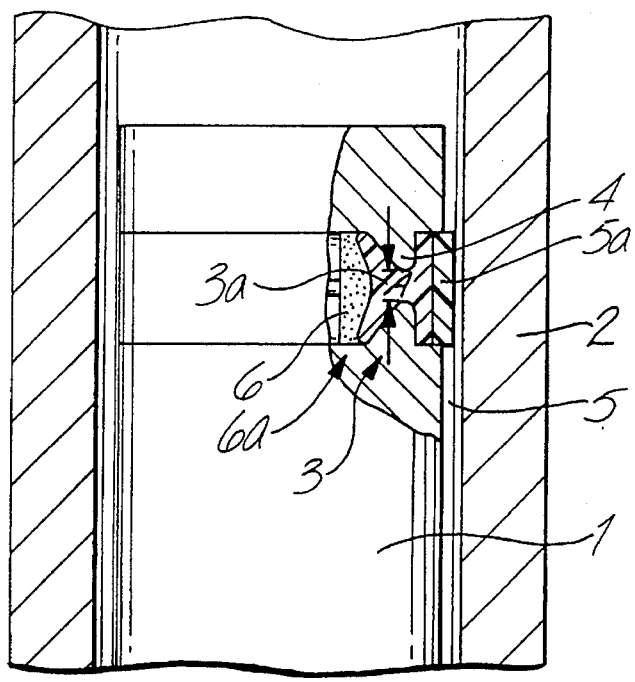

FIG. 1 illustrates the sealing assembly for a rotatable shaft 1 against a body or jacket portion 2. In the embodiment of FIG. 1, an elastomer layer 3a is fitted in a sealing space 3. The edges of walls defining space 3 are provided with inwardly directed protrusions 4. These protrusions 4 define therebetween a section A which is substantially narrower than the rest of the sealing space. The elastomer layer is directly molded in situ on either side of the narrower Section A, thus producing a massive sealing layer. Between the inner surface of sealing layer 3a and the bottom of sealing space 3 is provided a space 6a for hydraulic fluid 6 or compressed air or elastomer medium including vulcanized pieces of silicone elastomer or a room-temperature vulcanizing silicone elastomer cast in situ in space 6a. On top of sealing layer 3a is preferably mounted a sealing means 5a, made of, e.g., a harder elastomer, for effecting the actual sealing. Sealing means 5a is preferably vulcanized to be integral with sealing layer 3a.

Preferred elastomers include various silicones such as two-component, room-temperature vulcanizing silicone rubber. One example is silicone rubber RTV-2, shore hardness approximately 18 to 70, manufactured by Wacker-Chemie GmbH, Federal Republic of Germany. Most preferably, the elastomer used is selected from condensation hardener based silicone elastomers which set at room temperature. An advantage offered by silicone is that it does not readily stick to metal surfaces and is capable of deforming by the application of a minor force, behaving in the same way as a liquid in the sense that it cannot be permanently compressed.

It is also preferred that the elastomer be cast in situ. This eliminates the need for manufacturing separate molds independently for each application. If the silicone is cast in situ, it is preferred to use a two-component casting machine with a variable mixing ratio. The in situ cast elastomer is kept from substantially adhering to the walls by using an appropriate release agent such as various lubricants, waxes and powders that are compatible with the elastomer. For silicone, conventional soap and silicone grease have proved to be suitable release agents. During the operation of the sealing device, this type of release agent may gradually work its way out of the elastomer space and/or passages. However, the effect of such ejection of the release agent upon the adherence of elastomer to the walls remains practically negligible due to the fact that the reciprocating movement of elastomer relative to the walls causes a gradual crumbling of elastomer at the interface between the walls and the elastomer. The layer of crumbled elastomer acts as a release layer that prevents elastomer from sticking to the walls.

The seal, is operated by hydraulic fluid 6 that is pressurized by using a pressurizing unit 20, such as that described later and shown in FIG. 5. The hydraulic fluid applies pressure to elastomer sealing layer 3a resulting in a displacement of the sealing layer outward and, through the action of narrow section A, a deformation in sealing layer 3a, as well as the orientation of forces created in sealing layer 3a substantially against protrusions 4. This deformation of sealing layer 3a produces a pressure effect on the harder sealing means 5a urging it against body portion 2 so as to seal or pack a gap 5 between body portion 2 and shaft portion. When the pressure exerted by hydraulic fluid subsides, said sealing layer 3a resumes its shape through the action of a return force produced by the effect of narrow section A. Naturally, in certain cases, the packing or seal can be directly effected by means of sealing layer 3a.

Figure 2:
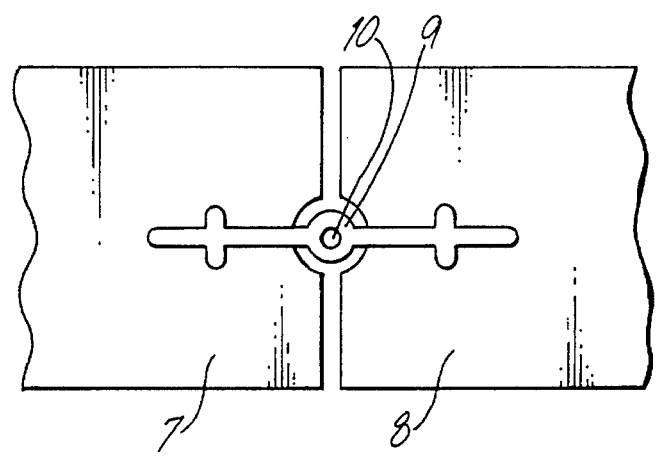

The embodiment of FIG. 2 shows an example of the packing of a joint between two concrete elements 7, 8. In this embodiment, inside a seal 9 there is formed an inflatable space 10 for a pressure medium. This space is formed, e.g., in such a manner that seal 9 is directly cast in situ around a nonreinforced two-component elastomer tube, or a prefabricated seal 9 is provided in a hole extending therethrough with a nonreinforced two-component elastomer tube. Seal 9 is placed or molded in the sealing spaces made in both surfaces to be sealed. The seal can be made pressure-resistant by supplying said space 10 with a pressurized hydraulic fluid or compressed air or some elastomer medium, whereby the pressurization of hydraulic fluid can be effected, e.g., by means of a pressurizing unit 20 shown in FIG. 5.

Figure 3A:
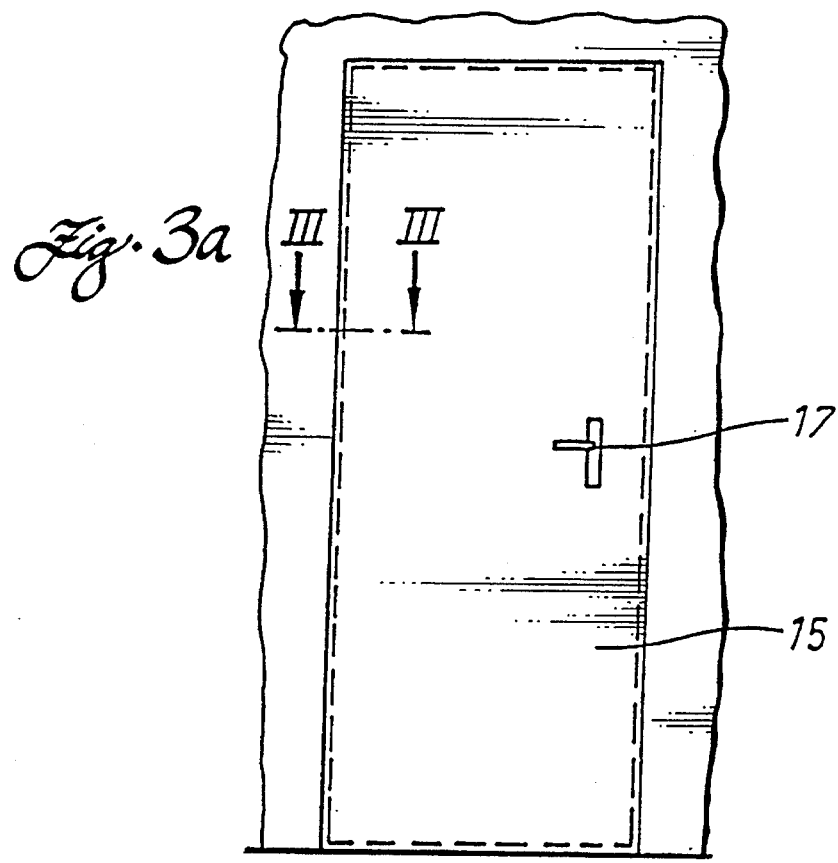
FIG. 3a is a side view of a seal assembly of the invention for a door.
Figure 3B:
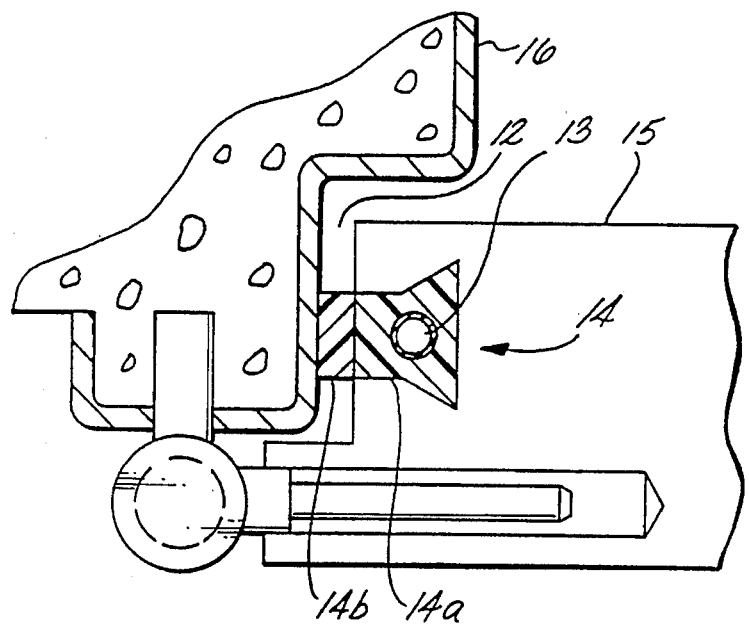

The embodiments of FIGS. 3a and 3b illustrate the use of a seal of the invention for sealing a door. In this embodiment, a sealing space 14 is preferably designed in a dovetail groove in the edge of a door to extend around the entire periphery of the door. The sealing space is fitted with a sealing layer 14a by casting it directly in situ around a nonreinforced two-component inflatable elastomer tube 13 (e.g., a standard hose), preferably near the bottom of sealing space 14. Pressurization of tube 13 with the application of a hydraulic fluid or silicone elastomer pieces can be effected by means of a pressurizing unit such as shown in FIG. 5. As pressurized hydraulic fluid is supplied therein, tube 13 expands resulting in a deformation in relatively soft elastomer layer 14a which, upon its outward expansion/displacement, presses against relatively hard sealing member 14b to seal a gap 12 between door 15 and jamb 16.

Expandable and contractible tube 13 contracts upon the release of the pressure therein which causes layer 14a to retract, with help from the dovetail, and the sealing member 14b thus releases its sealing pressure. Preferably, member 14B is fixed to layer 14a so that layer 14a pulls member 14b inward when layer 14a retracts.

Figure 4A:
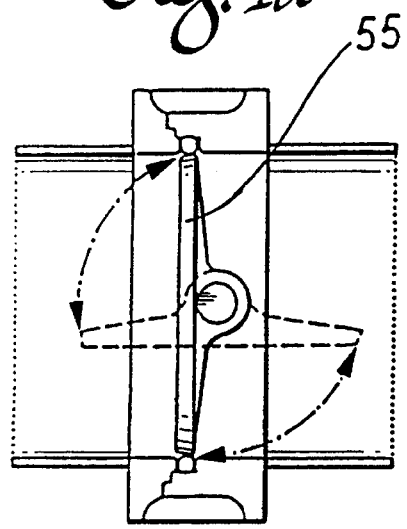
Figure 4B:
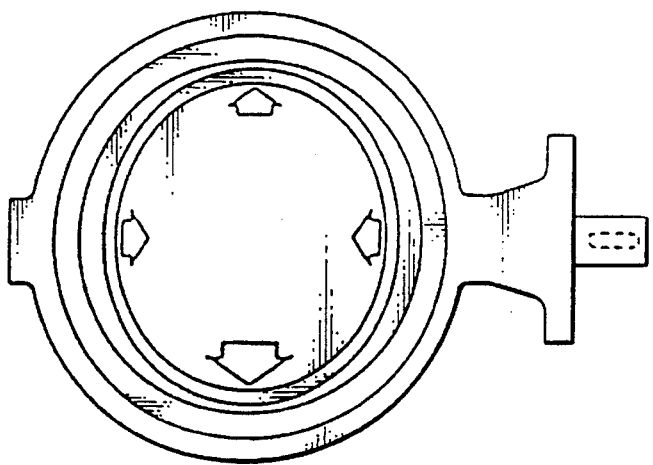
Figure 4C:
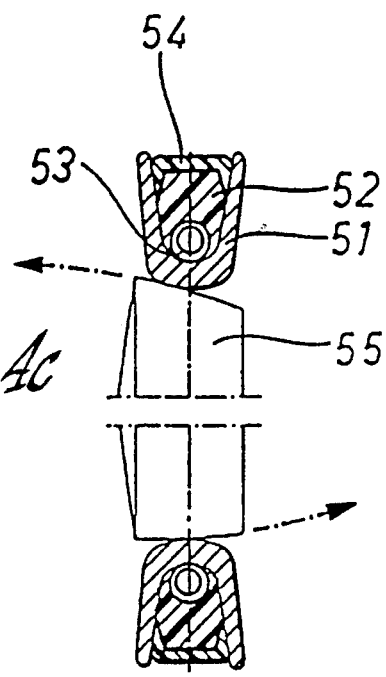

FIGS. 4a–4c illustrate the use of a seal of the invention in a flap valve. A flap 55 is normally sealed, e.g., by means of a metal gasket 51 having a U-shaped cross section. The performance of this gasket can be improved in accordance with the invention by casting an elastomer layer 52 in the groove of metal gasket 51. The casting is preferably effected around an elastomer tube 53 fitted in the groove, said tube being connected with pressurization means for pressurizing the tube with an appropriate medium, such as hydraulic oil, compressed air or elastomer. On top of elastomer layer 53 is preferably laid a sealing layer 54 which is made, e.g., of harder elastomer. This solution can also be effected, e.g., in a manner that an elastomer tube 53 fitted in the groove of a metal gasket matches in its cross section substantially the size of said groove, the elastomer being only cast inside said tube while the tube serves as a means carrying said sealing layer 54.

Figure 5:
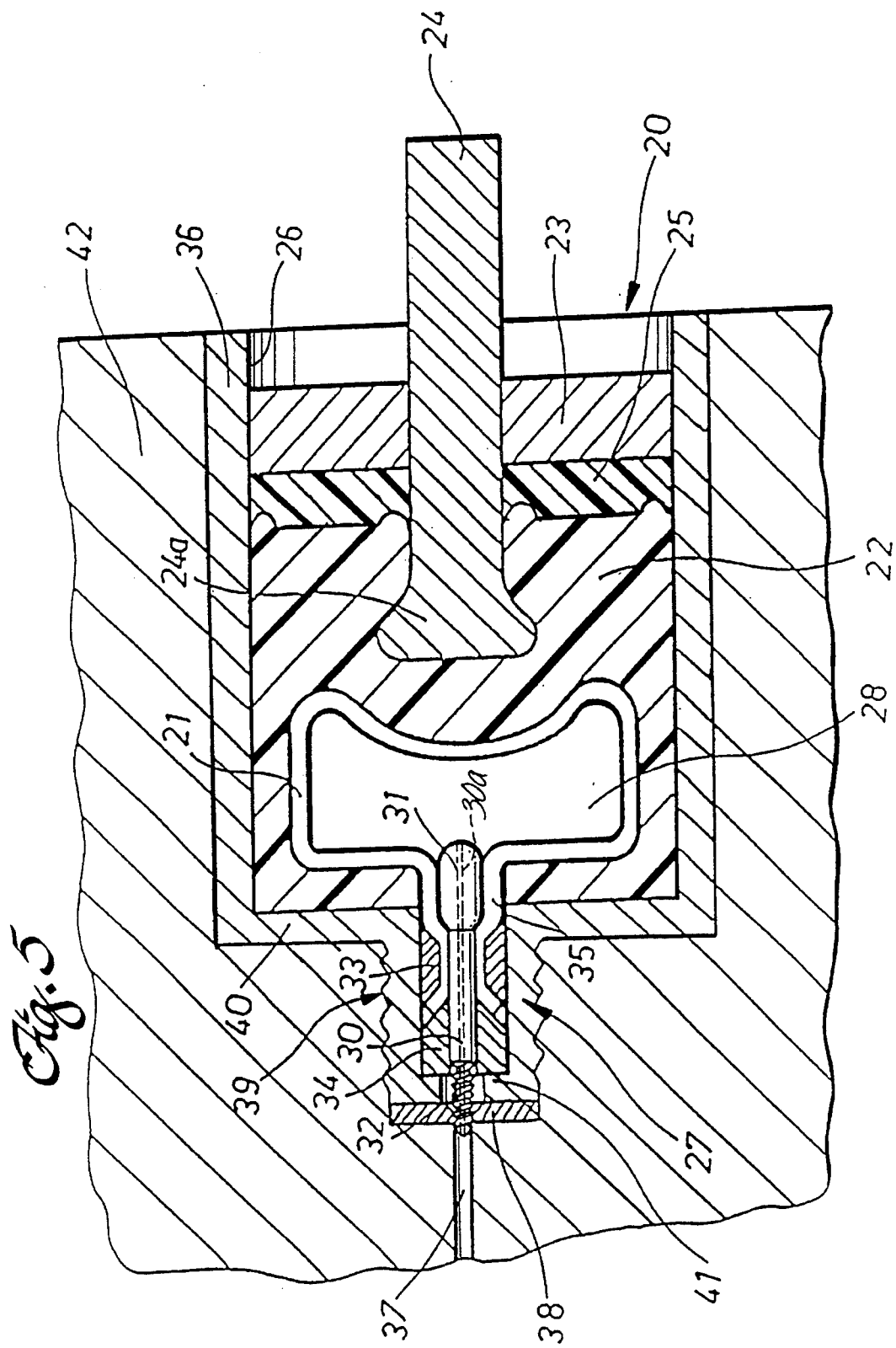
FIG. 5 is a sectional view of a pressurizing unit for the hydraulic oil used in a seal of the invention.

The pressurization of seal assemblies of the invention is preferably effected by means of a pressurizing unit 20 shown in FIG. 5. The pressurizing unit 20 preferably comprises a bushing-like body portion 36, fitted with a protrusion 39, fitted with an external threading and extending outward of cavity 26. Protrusion 39 is provided with a hole extending into cavity 26 and preferably fitted with an internal flange 41 at the end of protrusion 39 away from cavity 26. The cavity 26 of body portion 36 includes a space 28 for hydraulic fluid 7, e.g., by means of an elastomeric membrane 21 and a massive elastomer layer 22. In order to connect space 28 to a tube 37, the bottom of cavity 26 is provided with a coupling 27, comprising a connector tube 30 which has an interpal hole and one end of which is provided with an expansion 31 and the other end with a threaded portion 32, the internal throughhole 30a extending through expansion 31 and threaded portion 32. The coupling further includes a separate "bead" portion 33 and a separate sleeve portion 34. The coupling 27 is assembled in a manner that the bottom of membrane 21 carries a tubing section 35 which is pushed on top of the connector tube expansion 31 to extend beyond said expansion in the longitudinal direction. This is followed by placing the bead portion 33 on top of connector tube 30 from the end facing said threaded portion 32 and pushing it on top of tubing section 35 into the abutment with expansion 31. The bead portion 33 is preferably designed to include internal cones at both ends thereof. This is then followed by placing said sleeve portion 34 on top of connector tube 30 from the threaded end 32 and pushing it against bead portion 33 in a manner that said tubing section 35 is retained between bead 33 and sleeve 34. Finally, said connector tube 30 is fastened to body portion 36 by means of a nut 38 to be fastened to said threaded portion 32 extending through the hole of protrusion 39, said nut being tightened to a suitable tightness. The elastomer layer 22 surrounds membrane 21 completely up to coupling 27.

The section between layer 22 and the outer surface of body portion 36 further includes a piston 23 and between piston 23 and layer 22 there is also a gasket 25, made, e.g., of teflon or copper. In addition, the unit 20 preferably includes a plunger 24 which extends through piston 23 and gasket 25 into elastomer layer 22. The inner end of plunger 24 is provided with an enlargement 24a for improved adherence to layer 22. The movement of piston 23 and plunger 24 is effected, e.g., by means of conventional hydraulic, pneumatic or mechanical equipment. The space 28 can also be formed in a manner that the coupling member 27 is mounted on body portion 36 without any separate membrane 21 and its tubing section. This is followed by placing in cavity 26 an element made of, e.g., stearine or a similar material, which serves as a mold for space 28. This is followed by casting an elastomer layer 22 in the cavity and this layer is kept under pressure until it is solidified. Being under pressure, the elastomer penetrates into a gap between the conical surfaces of bead portion 33 and sleeve portion 34 setting in its position. After the elastomer is set, the stearine block formed in space 28 is melted by heating for draining the stearine out along the internal hole of connector tube 30. Finally, the pressurizing unit is attached to a cavity built, e.g., in a separate body element 42, the bottom of said cavity being provided with a threaded hole for protrusion 39, whereby said threaded hole can be sealed in a conventional manner, e.g., by means of a teflon strip. The bottom of the threaded hole in the cavity of body element 42 is further provided with a hydraulic tube 37 which can be further connected to a tube internal of the sealing, e.g., by means of the above-described coupling 27. This arrangement is capable of providing a closed assembly in a manner that the hydraulic oil in the system is contained in a passage confined at any given time by massive elastomer layers and thus, in practice, there are no holes for spills to occur.

Figure 6A:
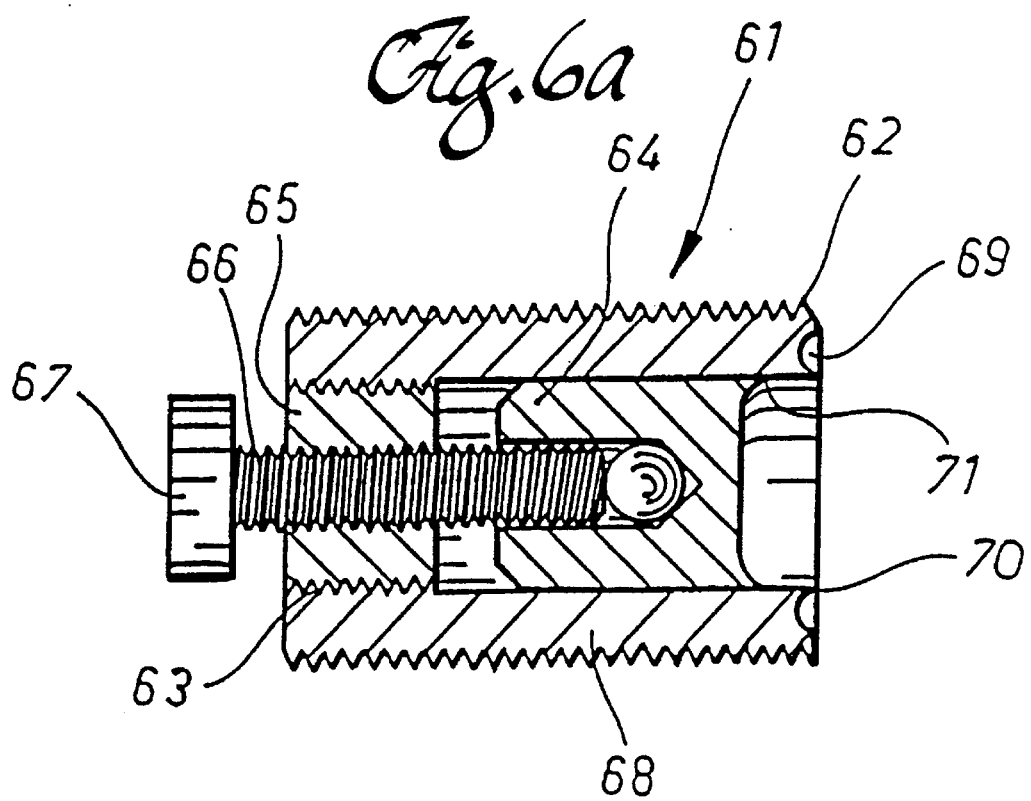
Figure 6B:
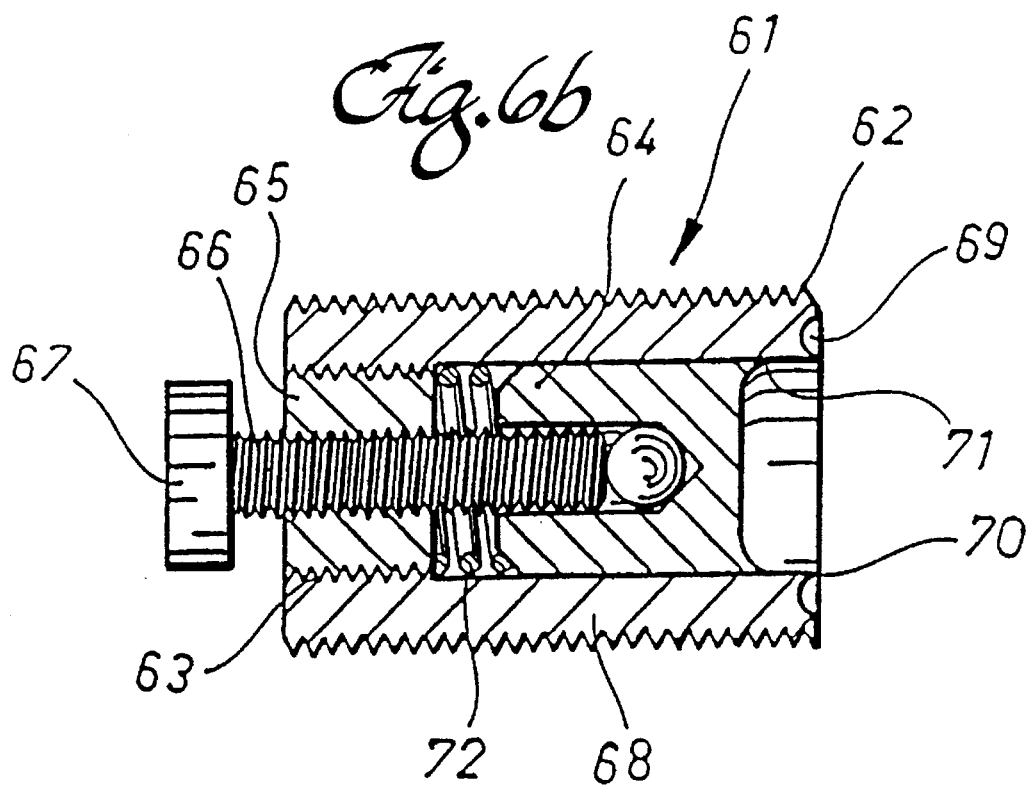
Figure 6C:
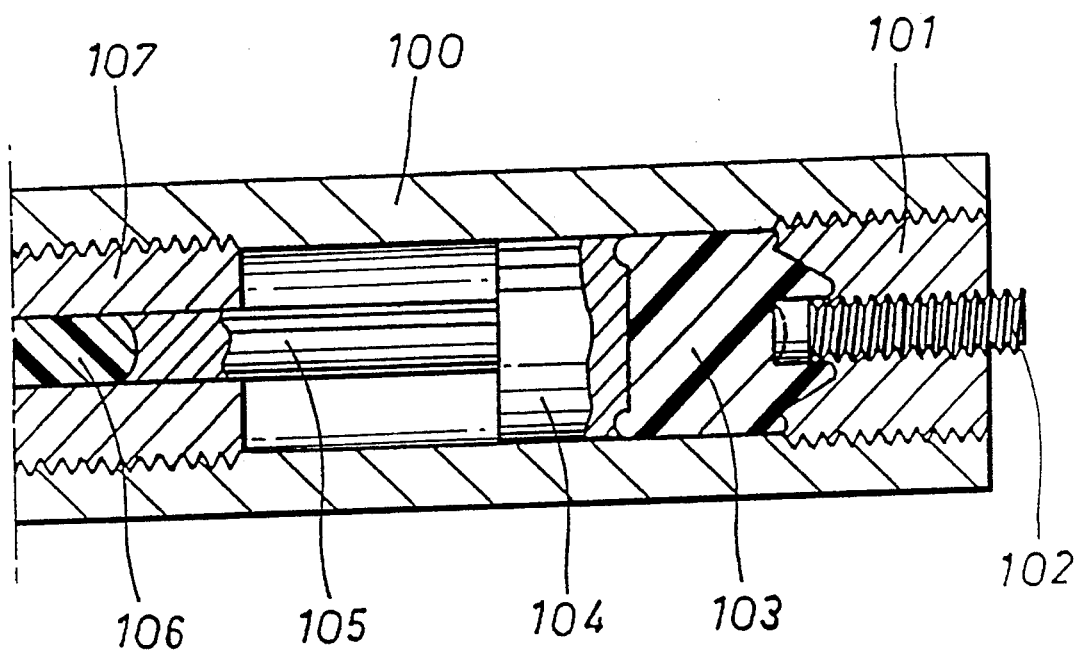

FIGS. 6a–6c illustrate some embodiments for mechanical pressurizing elements used in seal assemblies of the invention. On the one hand, a pressurizing element, such as a piston, a rod or the like, produces a pressure effect directly in the elastomer or elastomer medium which makes up a sealing layer. On the other hand, the elastomer medium can join directly with said sealing layer or through the intermediary of hydraulic oil, whereby the system can be referred to as hydro-mechanical, thus corresponding in principle to the hydraulic oil pressurizing unit shown in FIG. 5.

In the embodiment shown in FIG. 6a, a pressuring element 61 comprises an outer piston member 68 provided with a threaded portion 62 and having inside it an inner piston 64. The inner piston 64 is operated, e.g., by means of a screw member 66, said screw member being connected to outer piston 68 with a threading 63 through a spacer block 65. The screw member 66 is further provided with an operating head 67. The inner piston can also be operated, e.g., by means of an eccentric or some other per se known mechanical element. The outer piston member 68 is used for fixing the pressure medium 61, e.g., to the body section of a piece to be sealed, and it also serves as an initial pressure adjuster. The inner piston 64 performs the actual pressurization. The front surface of outer piston 68 facing the elastomer space or medium is preferably provided with a groove 69, the inner edge of outer piston 68 being formed with a lip portion 70 for preventing the passage of elastomer between inner piston 64 and the internal surface of outer piston 68 as said inner piston 64 extends beyond said front surface of outer piston 68. The inner piston 64 is provided with a corresponding lip portion 61 for preventing the passage of elastomer between inner and outer pistons as said piston 64 is positioned inside outer piston 68. At its end facing the elastomer, said inner piston 64 can be designed, e.g., wedge-shaped, for a more uniform distribution of the pressure applied to elastomer.

FIG. 6b illustrates a pressure medium similar to that of FIG. 6a, but fitted with a spring 72 which compensates for variations in the volume/pressure of elastomer caused by variations of temperature. This type of volume/pressure control can also be achieved by controlling the temperature, e.g., by means of electric resistance or the like.

Silicone rubbers such as are used with this invention generally exhibit very high thermal expansion, on the order of 6–8% per 100° C. A 6% compression of silicone rubber can cause a pressure increase of 1000 bar. It is desirable to include temperature controlling means to compensate for pressure changes caused by deviations in temperature.

Figure 8:
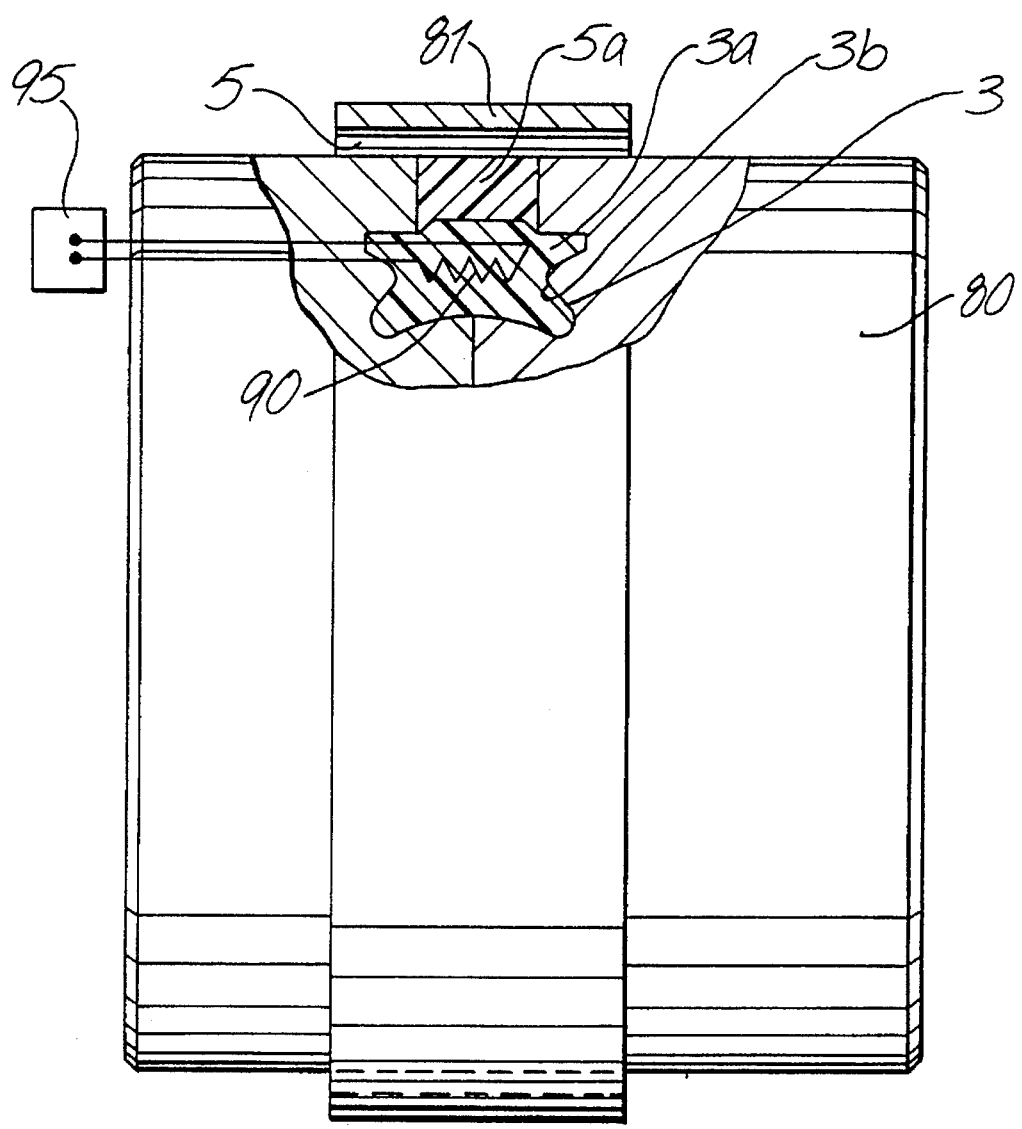
FIG. 8 is a sectional view of a pressurizing device that includes a temperature controlled heater.

Such a pressurizing device that includes a temperature-controlled heating element is illustrated in FIG. 8. Elastomeric sealing layer 3a in sealing space 3 includes electric heating coil 90 and temperature-controlled heating element 95. As heat is applied to the sealing layer, the elastomer expands causing an increase in pressure which effects the seal. As heat is removed, the elastomer contracts, reversing the seal. The elastomer is preferably cast in situ around the heating coil within the sealing space.

FIG. 6c illustrates an embodiment comprising a plurality of different size pistons connected successively to each other. For example, a screw thread is used for providing a body section 100 with a spacer block 101, fitted with a first piston or rod 102. The first piston acts on a first elastomer layer 103 which transmits the pressure to a second piston 104, having a surface area substantially larger than that of said first piston 102. The surface of second piston 104 facing away from first elastomer layer 103 is provided with a third piston 105, having a surface area substantially smaller than that of said second piston 104. The third piston 105 produces an increased pressure on a second elastomer layer 106 inside an inner tube 107, said piston assembly serving as an pressure booster or amplifier. The direction of amplification depends on the ratio of the piston surface areas to each other. In the embodiment shown in FIG. 1, for example, a second elastomer layer 106 is included in elastomer space 3 for pressurizing a sealing layer 3a therein. In this case, the elastomer layer 106 is preferably made of the same elastomer as sealing layer 3a and cast as an integral compound.

Figure 7A:
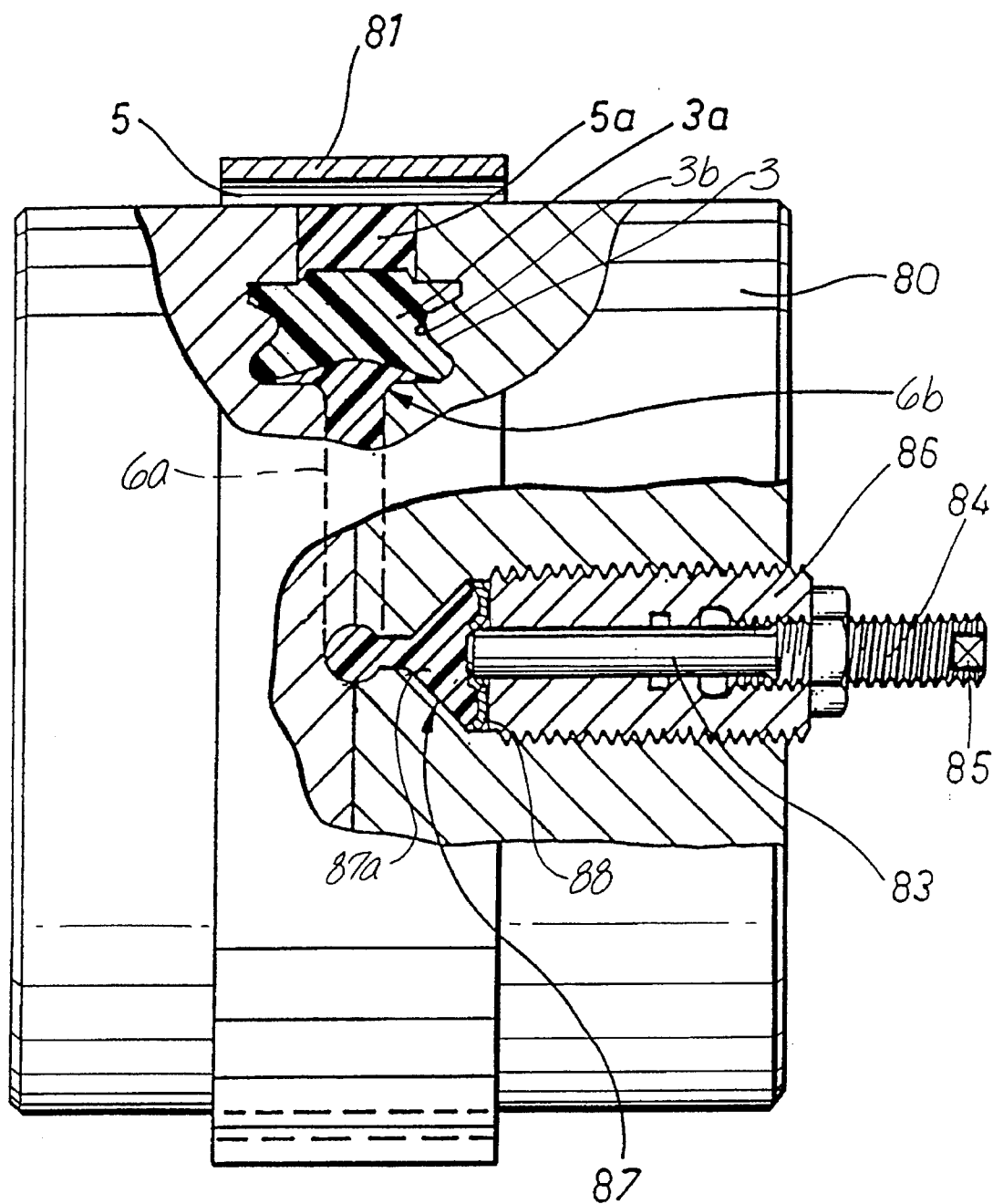

FIGS. 7a and 7b illustrate a combination of a mechanical pressurizing mechanism and a seal assembly. FIG. 7a shows the combination in an initial nonsealing position and FIG. 7b in an activated sealing position. The closed system shown in FIGS. 7a and 7b includes the pressurizing mechanism and the seal assembly which are connected by a conduit 6a formed within a body section 80. The body section is preferably formed by two elongate components mounted together with the interface plane extending in an axial direction. The pressurizing mechanism includes a cylinder 86 threaded to the body section 80. Inside the cylinder 86 there is a piston 83 provided with a threaded control portion 84 which allows adjustment of piston 83. The cylinder 86 communicates with a tapered first space 87 filled with elastomer 87a within the body, the walls of space 87 being treated with a suitable lubricant for allowing the elastomer 87a to move freely in space 87, thereby providing for transmission of pressure. The end of piston 83 abuts the elastomer 87a and is provided with a gasket 88 for preventing passage of elastomer into a gap between piston 83 and cylinder 86 or into a gap between cylinder 86 and body section 80. The elastomer 87 within the first elastomer filled space communicates with sealing space 3 by conduit 6a. The sealing assembly comprises an elastomer sealing layer 3a as well as a sealing member 5a of a harder elastomeric material relative to the sealing layer 3a.

The sealing layer 3a and sealing member 5a together fill a groove 6b that is defined by a surface of the body section. The inner portion of the groove includes side walls with protrusions 3b. Elastomer is preferably cast in situ in this inner groove portion to form elastomeric sealing layer 3a. It is also preferred that this elastomeric sealing layer 3a be bonded to the sealing member 5a.

To assemble the structure shown in FIGS. 7a and 7b, e.g., sealing member 5a is placed in position between the halves of body section 80, followed by joining the body section halves together, e.g., by means of a screw connection (not shown). This is followed by fitting cylinder 86 in its position and by carrying out elastomer casting with the help of piston 84 for laying the elastomer in its location. The first elastomer 87a in space 87a, conduit 6a and elastomeric sealing layer 3a can be cast as a single element, or sealing layer 3a can be cast separately, e.g., by providing separate casting gates leading into sealing space 3 and by blocking passage 6a, e.g., with a wax plug that can be removed after the sealing layer is set. The wax plug can be removed, e.g., by vaporization or by using appropriate chemicals.

The pressure from piston 83 is transmitted to sealing layer 3a by means of elastomer 87a, which extends from layer 3a to gasket 88. Alternatively, elastomer 87a may comprise a two-component room-temperature vulcanizing silicone in pieces. The pressure-transmitting medium can also comprise a hydraulic oil in conduit 6a (such as hydraulic fluid 6 in FIG. 1), whereby the sealing layer is cast first, the wax plug is removed, conduit 6a is filled with oil and an elastomer layer is cast in first space 87 to keep the conduit 6a with hydraulic oil closed by elastomer on each side of the oil. Such a closed system eliminates the possibilities of a hydraulic fluid leak.

Such a sealing assembly has a variety of applications, e.g., in flap and ball valves, and pistons. In such applications, temperature differences cause thermal expansion of the sealing material and must be compensated to achieve an even seal pressure. This is especially necessary when seal pressure and the pressure of the material to be sealed are close in order to achieve a low friction seal surface.

The sealing assembly can naturally be different from those described above. For example, in the case shown in FIG. 1, the seal can be fitted in jacket member 2 instead of shaft 1.

In operating the sealing member, piston 83 is threaded into the body 80 such as by using a suitable tool (not shown) that cooperates with head 85 of the threaded portion 84 of the piston. The first elastomer 87a is elastically deformed by the pressure imposed by piston 83 and this pressure is transmitted to the pressure medium in conduit 6a which in turn, transmits pressure to elastomeric sealing layer 3a. The elastomer is elastically deformed by the pressure and driven outwardly from the groove 6a pressing sealing member 5a outwardly from the surface of body 80 to seal against the opposing surface to be sealed 81.

The seal assembly is disengaged by threading piston 83 away from body 80 to release the pressure. The protrusions in the lower portion of the sealing space 3a cause the elastomeric sealing layer to spring back to its original shape when the pressure is released. This withdraws sealing member 5a from engagement with opposing surface 81.

The walls of the groove or cavity are preferably provided with a suitable release agent to minimize friction on layers 3a and 87 to avoid sticking.

The pressurization of seal assemblies of the invention can also be effected, e.g., by supplying into a space in the conduit or in the groove some pressurized two-component material which is allowed to set while maintained under pressure. Thus, the sealing can be maintained in activated state for a permanent sealing effect.

What is claimed is:

1. A seal assembly comprising:
   a body portion;
   a cavity formed in a surface of the body portion and having inner and outer portions, wherein the outer portion includes first side walls defining the groove and the inner portion includes second side walls defining the groove, a bottom wall and at least one protrusion from the second side walls into the cavity;
   a seal member disposed in the outer portion of the cavity and in slidable engagement with the first side walls for sealing a gap between the surface of the body portion and a cooperating surface of an element to be sealed;
   an elastomeric medium disposed in the lower portion of the cavity and attached to the seal member, the protrusion extending into the elastomeric medium and the elastomeric medium being softer than the seal member; and
   means for selectively pressurizing and depressurizing the elastomeric medium, wherein when pressure being applied by the pressurizing means is released, the protrusion and the elastomeric medium cooperate for withdrawing the seal member from engagement with the element to be sealed, and wherein the pressurizing means comprises a temperature-controlled heater.

2. The seal assembly of claim 1 wherein the elastomeric medium comprises a room-temperature vulcanizing silicone elastomer compound which is cast in situ in the inner portion of the cavity.

3. A seal assembly comprising:
   a body portion;
   a cavity formed in a surface of the body portion and having inner and outer portions, wherein the outer portion includes first side walls and the inner portion includes second side walls and a bottom wall;
   a seal member disposed in the outer portion of the cavity and in slidable engagement with the first side walls for sealing a gap between the surface of the body portion and a cooperating surface of an element to be sealed;
   an elastomeric medium disposed in the lower portion of the cavity and attached to the seal member, the elastomeric medium comprising a room-temperature vulcanizing silicone elastomer compound which is cast in situ, the elastomeric medium being softer than the seal member; and
   actuating means for selectively pressurizing and depressurizing the elastomeric medium, wherein the actuating means comprises a temperature-controlled heater.

4. The seal assembly of claim 3 wherein the inner portion of the cavity further comprises at least one protrusion from the second side walls into the inner portion of the cavity, the protrusion extending into the elastomeric medium, wherein when pressure being applied by the actuating means is released, the protrusion and the elastomeric medium cooperate to withdraw the seal member from engagement with the element to be sealed.

\* \* \* \* \*